(12) United States Patent
Kramer

(10) Patent No.: US 7,946,457 B2
(45) Date of Patent: May 24, 2011

(54) TRUCK RACK

(76) Inventor: Jerry Dixon Kramer, Atlanta, GA (US)

( * ) Notice: Subject to any disclaimer, the term of this patent is extended or adjusted under 35 U.S.C. 154(b) by 1189 days.

(21) Appl. No.: 11/261,330

(22) Filed: Oct. 28, 2005

(65) Prior Publication Data

US 2006/0163300 A1    Jul. 27, 2006

Related U.S. Application Data

(63) Continuation-in-part of application No. 29/221,816, filed on Jan. 21, 2005, now Pat. No. Des. 542,731.

(51) Int. Cl.
*B60R 9/00* (2006.01)
(52) U.S. Cl. ........ 224/405; 224/402; 224/325; 224/316; 296/3
(58) Field of Classification Search .......... 224/405, 224/402, 403, 325, 309, 320, 316; 296/3, 296/36, 180.1, 181.3, 37.6, 181.5, 10; D12/406, D12/412; 211/206
See application file for complete search history.

(56) References Cited

U.S. PATENT DOCUMENTS

| | | | | |
|---|---|---|---|---|
| 2,570,802 | A | 10/1951 | Hatteburg | 224/42.45 |
| 3,223,301 | A | 12/1965 | Helm | |
| 3,554,416 | A | 1/1971 | Bott | |
| D220,688 | S | 5/1971 | Zulim | D14/3 |
| 3,656,803 | A | 4/1972 | Brown et al. | 296/102 |
| 3,724,730 | A | 4/1973 | Olsen | |
| 3,765,713 | A * | 10/1973 | Suitt | 296/3 |
| 3,955,845 | A * | 5/1976 | Werner | 296/10 |
| 4,057,281 | A | 11/1977 | Garrett | 269/3 |
| 4,171,674 | A | 10/1979 | Hale | 114/243 |
| 4,211,448 | A * | 7/1980 | Weston | 296/3 |
| 4,267,948 | A | 5/1981 | Lewis | |
| D262,698 | S | 1/1982 | Hagist | D12/156 |
| 4,318,565 | A * | 3/1982 | Lay | 296/180.1 |
| D305,111 | S | 12/1989 | Zagner | D12/156 |
| 5,002,324 | A | 3/1991 | Griffin | 296/3 |
| 5,056,855 | A * | 10/1991 | Moravsky | 296/98 |
| 5,061,000 | A | 10/1991 | Haugen et al. | 296/3 |
| 5,104,018 | A | 4/1992 | Dixon | |
| 5,137,320 | A | 8/1992 | Christensen | 296/3 |
| 5,143,415 | A | 9/1992 | Boudah | 296/3 |
| 5,316,190 | A | 5/1994 | Bullock | 224/42.42 |
| 5,393,114 | A | 2/1995 | Christensen | 296/36 |
| 5,470,003 | A | 11/1995 | Chucheran | |

(Continued)

OTHER PUBLICATIONS

U.S. Appl. No. 29/221,816, filed Jan. 2005, Kramer.

(Continued)

*Primary Examiner* — Justin M Larson
*Assistant Examiner* — Steven M Landolfi, Jr.
(74) *Attorney, Agent, or Firm* — Jonn R. Benefiel

(57) ABSTRACT

A truck rack (10) for a bed (14) of a pickup truck (12) in which a pair of opposing front supports (18) and a pair of opposing rear supports (20) attach at respective lower ends to the bed of the pickup truck, with the rear supports (18) each having a leading edge and a trailing edge defined by opposing surfaces that taper from a transverse spacing to the respective leading and trailing edges and the front supports (20) each have a trailing edge defined by opposing surfaces that taper from a transverse spacing to the trailing edge of the front support, with a pair of opposing side rails (22) that attach to respective front and rear supports, and interconnect by forward, intermediate, and rear transverse members (28) extending between and attached to the opposing side rails.

10 Claims, 5 Drawing Sheets

U.S. PATENT DOCUMENTS

| | | | | |
|---|---|---|---|---|
| 5,722,340 | A | 3/1998 | Sweetman | 114/243 |
| 5,725,137 | A | 3/1998 | Macdonald | 224/405 |
| 5,806,905 | A | 9/1998 | Moore | |
| 5,845,827 | A | 12/1998 | Reising | 224/316 |
| 5,924,835 | A | 7/1999 | Ross | 414/462 |
| 5,988,722 | A | 11/1999 | Parri | |
| 6,126,229 | A * | 10/2000 | Lund | 296/180.1 |
| D434,364 | S | 11/2000 | Bauer et al. | |
| D436,915 | S | 1/2001 | Burger | D12/406 |
| D444,446 | S | 7/2001 | Carter | D12/406 |
| 6,279,802 | B1 | 8/2001 | Hickman et al. | 224/321 |
| D463,358 | S | 9/2002 | Thomas | D12/406 |
| 6,513,849 | B2 | 2/2003 | Carter | 296/3 |
| D481,003 | S | 10/2003 | Bauer et al. | |
| 6,655,722 | B2 | 12/2003 | Bareket | 296/3 |
| 6,827,532 | B1 | 12/2004 | Nix | 410/106 |
| 6,883,848 | B1 | 4/2005 | Iverson et al. | 296/3 |
| 6,942,279 | B1 * | 9/2005 | Hoover | 296/159 |
| D515,495 | S | 2/2006 | Storer | |
| D577,327 | S | 9/2008 | Jung et al. | |
| D578,467 | S | 10/2008 | Ohanyan | |
| 2003/0168879 | A1 | 9/2003 | Grudek | 296/100.15 |
| 2004/0026945 | A1 | 2/2004 | Kench, III et al. | |
| 2004/0036308 | A1 | 2/2004 | Sloss | |
| 2004/0201240 | A1 | 10/2004 | Corbett | 296/100.18 |
| 2005/0023314 | A1 | 2/2005 | Williams et al. | 224/320 |
| 2008/0264988 | A1 | 10/2008 | Thomas et al. | |

OTHER PUBLICATIONS

U.S. Appl. No. 29/241,549, filed Oct. 2005, Kramer.
Kargo Master Pro-II Truck Rack, www.truckaddons.com/Catalog/subpages/kargomaster truck&van.htm.
Modular System One Ladder Rack, www.americanvan.com/catalog/standard_wide_slidedrawer.cfm?Family ID=98.
Mirage Truck Rack, www.altech.ab.ca/jembrack.
Truck Tools$^{SM}$ Contractor's Rack, www.jcwhitney.com/autoparts/Product Display/s-10101/p-7190/c-10101.
JR's Truck Accessories, Dec. 27, 2004.
Heavy Duty pick-up truck rack, www.americanvan.com/catalog/standard_dynamic_wrap.cfm?Family ID=251.
Some typical existing truck rack designs (Oct. 19, 2004).
Hauler Racks Truck Racks, www.truckaddons.com/catalog/subpages/haulerracks.htm.
International Preliminary Report on Patentability, PCT/US06/42238, May 8, 2008.

* cited by examiner

TRUCK RACK

This application claims the benefit under 35 U.S.C. 120 as a continuation-in-part of co-pending U.S. design patent application 29/221,816, filed Jan. 21, 2005, U.S. Patent No. D542,731.

TECHNICAL FIELD

The present invention relates to accessories for motor vehicles. More particularly, the present invention relates to a streamlined truck rack for use as an accessory for pickup trucks.

BACKGROUND OF THE INVENTION

The accessory market for motor vehicles in recent years has become a significant industry, and particularly for accessories provided through after-market product manufacturers to end consumers directly or through distributors and retail outlets. After-market products are typically owner-acquired and installed items, and both ornamental and mechanical devices, including lights and lighting devices, sound systems, air stream and ground effects including spoilers and fairings, wheels and tires, mechanical components including engine operating controllers, suspension modifying devices, and other electromechanical devices to accessorize motor vehicles from that provided by the original manufacturer.

Trucks have become a particularly popular segment of the motor vehicle industry. Trucks are used for a wide range of activities but particularly pickup trucks with open beds are used in construction and service industries and by individuals, which have needs to carry extended equipment or components in the bed of the truck. This equipment and components include ladders, poles, piping, lumber, and the like. Elevated frame member racks have been developed to facilitate the transportation and handling in pickup trucks items having these particular physical characteristics. Truck racks for pickup trucks include four corner posts that extend upwardly from the bed or sidewall of the bed of the pickup truck. Elongate side rails attach on each side of the bed to upper ends of two of the supports. The rails interconnect by transverse members. Such truck racks provide an elevated structure on which ladders, boards, poles, tools, and the like can be attached and transported.

Such truck racks are utilitarian in nature, and as such, have been satisfactory for handling construction and service requirements. However, with the growth in the truck market and the appreciation of trucks for ornamental and ordinary transportation purposes, such utilitarian truck racks lack the ornamental features many non-utility customers would seek for accessorizing a pickup truck. For example, accessory after market products such as ground effect fairings, airfoils, and spoilers are often painted to match the motor vehicle paint. However, it is impractical to customize currently available truck racks.

Further, pickup truck beds differ in size. Generally, pickup trucks have either a short bed or a long bed. However, the specific dimensions from one manufacturer of these short bed and long bed pickup trucks differ.

Accordingly, there is a need in the industry for a truck rack for pickup trucks that provide not only utilitarian features but meet expected ornamental accessorization requirements as well. It is to such that the present invention is directed.

SUMMARY OF THE INVENTION

The present invention meets the need in the industry by providing a truck rack for a bed of a pickup truck, comprising a pair of opposing front supports and a pair of opposing rear supports. Each of the front and rear supports have a lower end adapted for fixedly connecting to a bed of a pickup truck and an opposing upper end. The rear supports each have a leading edge and a trailing edge defined by opposing surfaces that taper from a transverse spacing of the opposing surfaces to the respective leading and trailing edges of the rear supports. The front supports each having a trailing edge defined by opposing surfaces that taper from a transverse spacing of the opposing surfaces to the trailing edge of the front support. A pair of opposing side rails each attach to a respective one of the front supports and one of the rear supports. A forward, intermediate, and rear transverse member extend between and attach to the opposing side rails to hold the side rails in spaced-relation and to support articles thereon.

Objects, advantages, and features of the present invention will become apparent upon a reading of the following detailed description and claims in view of the appended drawings.

DETAILED DESCRIPTION

Figure 1:
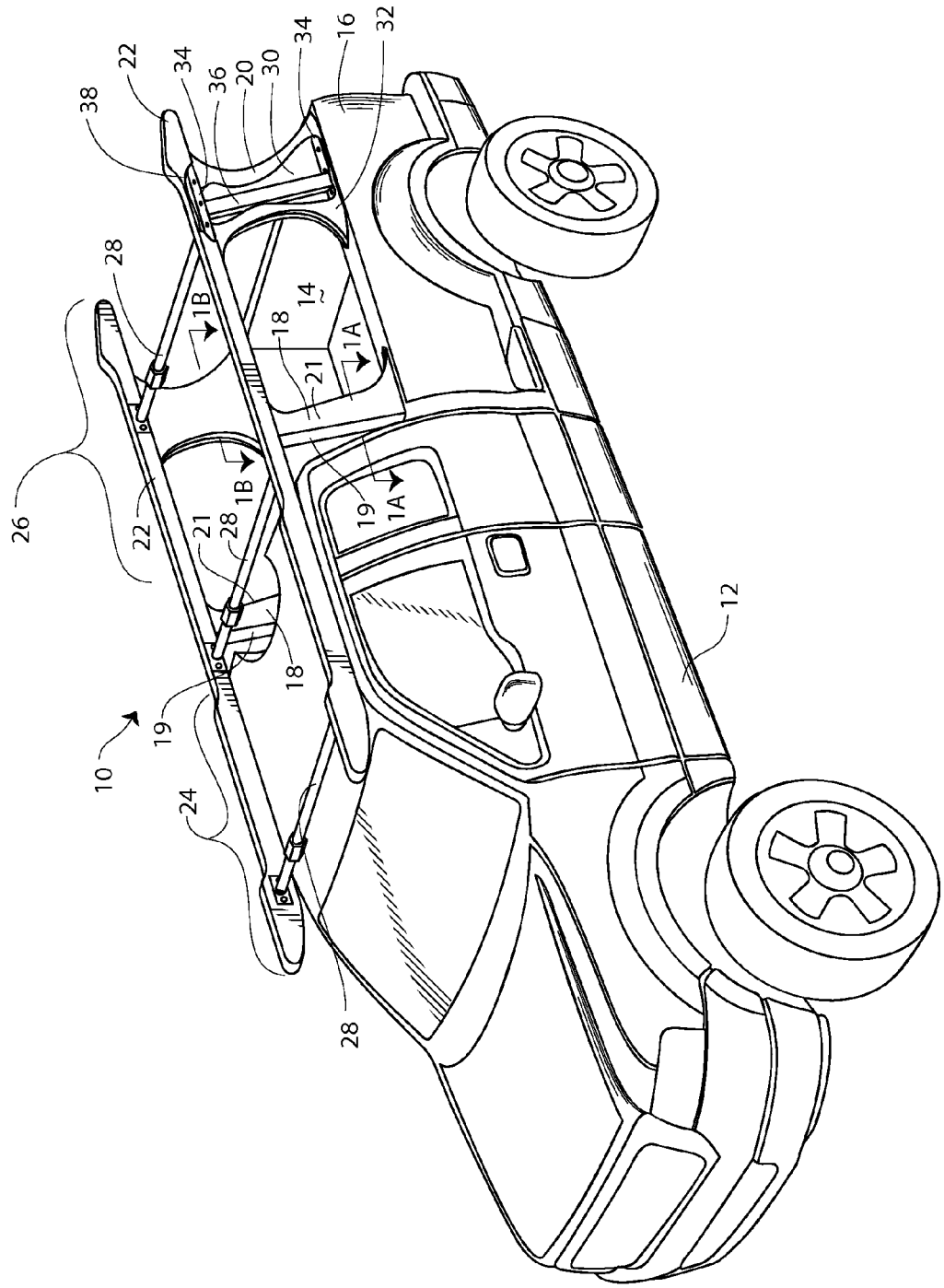
FIG. 1 is a perspective view of a truck rack for pickup trucks according to the present invention.

Referring now in more detail to the drawings, in which like numerals indicate like parts throughout the several views, FIG. 1 ilustrates in perspective view a pickup truck rack 10 mounted to the bed of a pickup truck 12. The pickup truck 12 includes a truck bed generally 14 having opposed sidewalls 16. The truck rack 10 includes a pair of opposing front supports 18 and a pair of rear supports 20. The front supports 18 attach to the sidewalls 16 near the cab of the pickup truck 12. The rear supports 20 attach to the sidewalls 16 spaced-apart from the front supports and near the tailgate of the pickup truck 12. The front supports 18 and the rear supports 20 extend upwardly from the sidewalls 16 to respective distal ends. A pair of side rails 22 attach to respective aligned ones of the front supports 18 and rear supports 20 on each side of the pickup truck. The side rails 22 include a forward portion 24 that extends longitudinally generally from the front support 18 towards the front of the pickup truck 12 and terminates at a forward end over a forward roof portion of the cab. The side rails 22 include a bed portion 26 generally extending generally from the front support to rearward of the rear supports 20. The side rails 22 interconnect by spaced-apart transverse members 28. Generally one transverse member 28 attaches between the side rails at each of a forward, intermediate, and rear portion of the side rails to maintain the side rails in spaced relation and to provide support for elongate equipment and supplies to be carried on the truck rack 10. Other transverse members 28 may be attached between the side rails 22 to provide additional intermediate support for articles carried on the truck rack 10.

In the illustrated embodiment as shown in partial cut-away view, the truck rack 10 comprises an internal frame generally 30 and an exterior molded ornamental and areodynamic shell generally 32. The front and rear supports 18, 20 each include opposing base plates 34 that define threaded openings for receiving threaded fasteners, such as nuts welded to openings in the base plates that receive bolts, for attaching the front and rear supports 18, 20 to the sidewalls 16 and to the side rails 22, as discussed below. An elongate tubular member 36 extends between and attaches to the opposing base plates 34. As shown in partial cut-away view, each side rail 22 also includes an elongated tubular member 38. The tubular members 38 define similar threaded openings for rigidly connecting with fasteners to the distal ends of the front and rear supports 18, 20. The front and rear supports 18, 20 and the side rails 22 are readily manufactured in a fiberglass molding operation in which molds receive the respective plates and elongate members and with fiberglass sheet and resin are molded to define the particular ornamental shell or housing surrounding the internal frame members. Such materials are readily painted to match the paint color of the pickup truck to which the truck rack is attached.

The front and rear supports 18, 20 in the illustrated embodiment are configured for angling relative to vertical from the sidewalls 16 to the side rail 22, such that there is a slight oblique tapering from the sidewalls 16 towards the opposing sidewall of the truck bed. This angled orientation of the front and rear supports 18, 20 towards the opposing front and rear supports facilitates the rigidity and strength of the truck rack 10. The angle of inclination is about 10° from vertical.

Figure 1A:
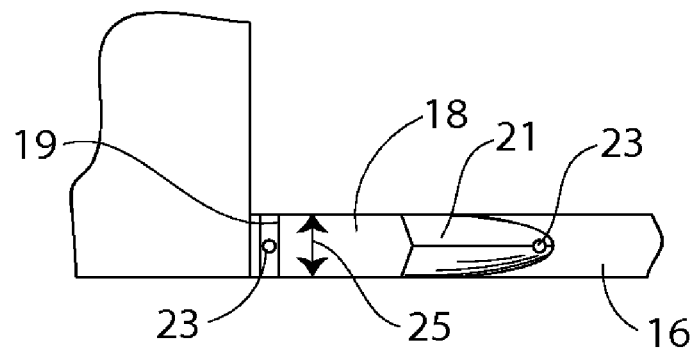
FIG. 1A is a cross-sectional plan view of a front support for the truck rack shown in FIG. 1, taken along line 1A-1A.

With reference to FIGS. 1 and 1A showing a top plan view of the front support 18 taken along line 1A-1A, the forward support 18 in the illustrated embodiment has a forward side 19 that is disposed closely to a back wall of the cab of the pickup truck 12. In the illustrated embodiment, the forward side 19 is planar, but may in alternate embodiments conform to the shape or angle of a particular back wall of a pickup truck cab. A trailing side 21 however extends arcuately between a connection foot for connecting the front support to the sidewall 16 and an opposing connection header for attaching to the side rail 22. The connection footer and the connection header each include at least one opening 23 for receiving a threaded fastener. The opposing sidewalls of the front support may bow outwardly, may be substantially planar, or a combination, for a selected ornamental effect. Nevertheless, the front support 18 tapers front to back from a transverse horizontal spacing generally designated 25 of the opposing sidewalls to the trailing side 21, so that the front support 18 is narrower at the rearward or trailing side than at the transverse horizontal spacing of the opposing sidewalls, as best illustrated in FIG. 1A. For ornamental and aerodynamic effects, the width of the front support 18 varies incrementally horizontally and vertically as the opposing sides taper together to the trailing edge and as the trailing edge arcuately curves between the header and the footer.

Figure 1B:
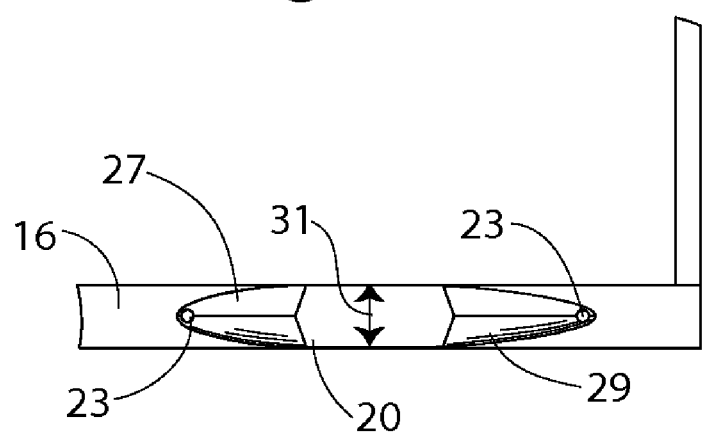
FIG. 1B is a cross-sectional plan view of a rear support for the truck rack shown in FIG. 1, taken along line 1B-1B.

With reference to FIGS. 1 and 1B showing a top plan view of the rear support 20 taken along line 1B-1B, the rear supports 20 each include a forward arcuate edge 27 and an opposing rearward arcuate edge 29. Each forward and rearward edge extends between a footer and a header, which each include openings 23 for receiving fasteners to attach the rear support to the side wall 16 and the side rail 22. Further, the rear support 20 has opposing sides that in the illustrated embodiment bow outwardly medial the leading and trailing edges. The opposing sides accordingly taper in opposing directions from a transverse spacing generally designated 31 of the opposing sides to the forward or leading side 27 and to the rearward or trailing side 29, respectively, and thereby providing both an ornamental side support but a streamlined, areodynamic feature as well. Other ornamental configurations are readily within the scope of the present invention.

The side rails 22 are generally elongate members, and in the illustrated embodiment have stylized opposing curved forward and rear ends, as well as stylized forward portion 24 and rearward portion 26. The stylization may be varied without departure from the present invention.

Figure 2:
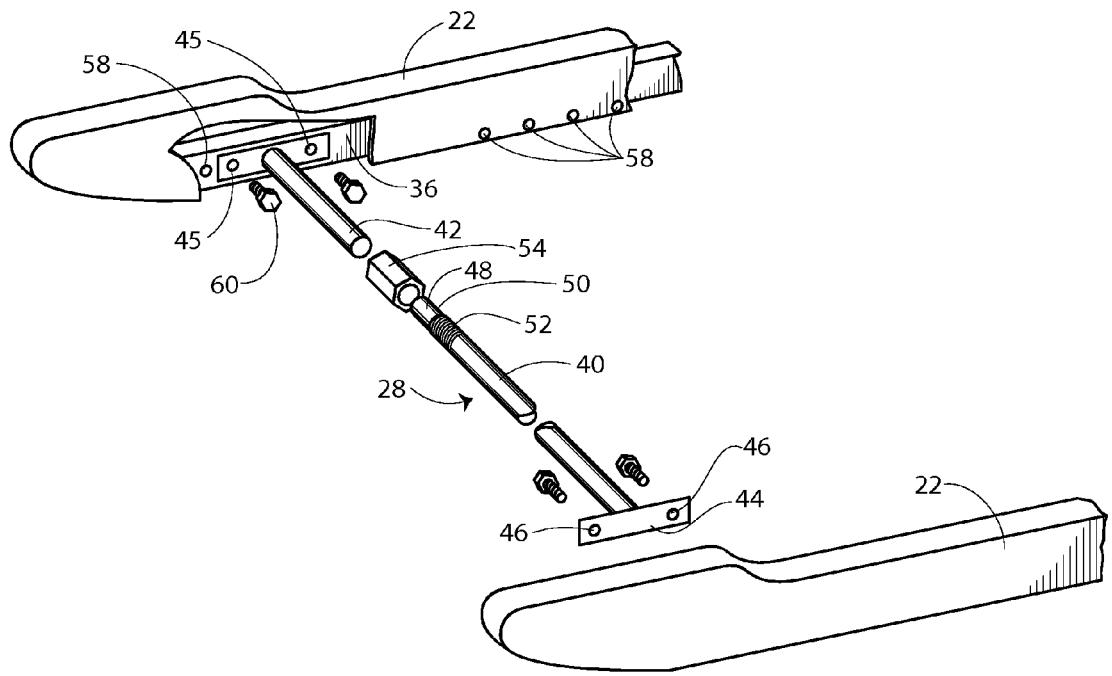
FIG. 2 is a detailed perspective, exploded and partially cut-away view of the truck rack illustrated in FIG. 1 to show features of the side rails and the transverse members.

FIG. 2 illustrates in perspective exploded view the transverse member 28 and the side rails 22. The transverse members 28 are identical. The transverse member 28 is adjustable in its length, so that the truck rack 10 can be sized to accommodate different widths of truck bed, depending upon the manufacturer of the pickup truck on which the truck rack 10 is to be installed. The transverse member 28 includes a primary member 40 that telescopically receives a secondary member 42. Respective ends of the primary and secondary member each attach to a connecting plate 44 such as by welding or other securing mechanism. The plate 44 defines opposed openings 46 for receiving fasteners to attach the plate to the respective side rail 22. The plate 44 in the illustrated embodiment includes loops 45 on opposing sides of the secondary member 42 (or primary member 40 for the opposing plate 44) for engaging connector straps and tie-down straps for holding articles to the truck rack. In an alternate embodiment, eye bolts having a loop and threaded member can be used as fasteners for attaching the plate 44 to the side rail 22, for similar purpose.

A distal end 48 of the primary member 40 defines spaced-apart longitudinal slits 50 extending from the edge. The slits 50 define flexible portions of the member at the end, for a purpose discussed below. The primary member 40 defines a threaded exterior portion 52 adjacent the distal end 48.

A coupler 54 defines a passageway into which the primary member 40 extends. The passageway is threaded from a first end towards the opposing end. The thread does not extend the full length of the coupler 54. The diameter of the passageway in the coupler 54 narrows from the cessation of the threaded portion to the opposing open end.

The elongate tubular member 36 and the side rail 22 include openings generally 58 for receiving threaded fasteners 60 to secure the plate 44 to the side rail 22 and thus rigidly connect the transverse member 28 to the side rails 22.

The free end of the secondary member 42 extends through the coupler 54 and into the open end of the primary member 40. The overall length of the primary member and the telescopically received secondary member 42 adjusts to accommodate the particular width of the truck bed to which the truck rack 10 is attached. The coupler 54 rotates to engage the threaded interior with the threaded portion 52. As the coupler 54 tightens onto the threaded portion 52 of the primary member 40, the narrowing interior wall of the coupler 54 bears against the end portion 48. The slits 50 permit the end portions to move inwardly as the tapering interior wall bears upon the end of the primary member 40. The flexible portions bear rigidly against the outer surface of the secondary member 42 and thereby lock the secondary member 42 and the primary member 40 together so that the overall length is held sufficient to connect to the side rails 22 for the particular dimensions of the truck bed. It is to be appreciated that in alternate embodiments, the members 40, 42 secure together with fasteners that extend transverse to the members through aligned openings. The fasteners include bolts, pins, set screws, or the like, to lock the members 40, 42 in a selected length between the side rails 22.

Figure 3A:
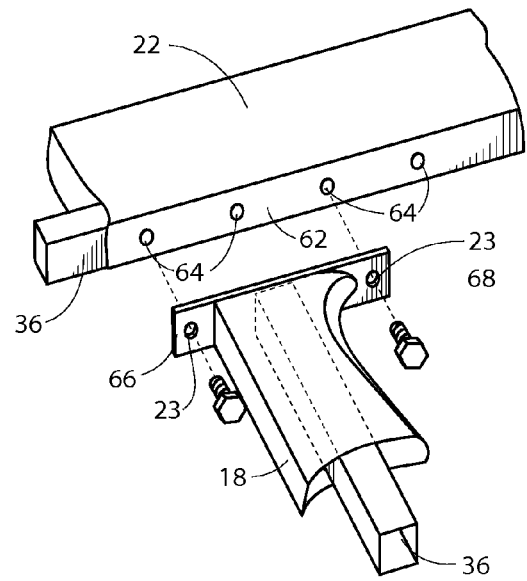
FIG. 3A is a perspective detailed view of a portion of the truck rack illustrated in FIG. 1 showing the connection of a front support to a side rail.

FIG. 3A is a perspective exploded view of a portion of the side rail 22 showing a bottom edge 62 and a portion of the elongate tubular member 36. The bottom edge 62 defines a plurality of spaced-apart openings 64. The openings are preferably threaded in the elongate member 36 or aligned with a nut fastened to the elongate member 36 for receiving a bolt, for securing the forward support 18 to the side rail 22. The front support 18 includes the plate 34 that has forward and trailing legs 66, 68. Each leg defines the opening 23 fir receiving a threaded fastener for engagement with respective threaded openings 64 in the side rails 22. In an alternate embodiment, the legs 66, 68 are integral extensions of the forward support. The rear support 20 connects in a similar manner. In an alternate embodiment, the rear support rigidly connects to the frame 36 for the side rail 22 with fasteners from the frame into the plate prior to forming the shell. Other connection fasteners may be readily used.

Figure 3B:
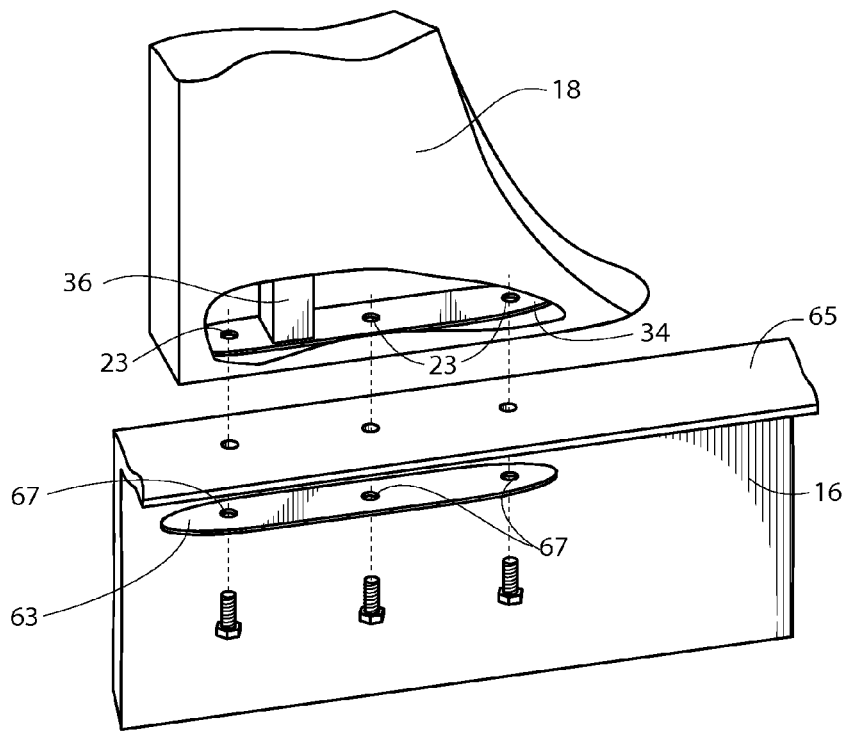
FIG. 3B is a perspective exploded view of a portion of the truck rack illustred in FIG. 1 showing a connection of the front support to the side wall of the pickup truck.

FIG. 3B is a perspective exploded view detailing one mechanism for securing the footer to the side wall 16 of the truck bed 14. A plate 63 is received under a lip 65 of the side wall 16 and defines openings 67 that align with the openings 23 in the plate 34 and openings 69 formed in the lip. Fasteners extend through the openings in the plate 63 and the lip, and tighten in the openings 23 for securing the lower end of the front or rear supports to the side wall. Other plate and fastener configurations known in the industry are usable for securing the front and rear supports. Angled members may be used to connect the plate 34 to the side wall through stake pocket openings in the side wall of the truck bed.

Figure 4:
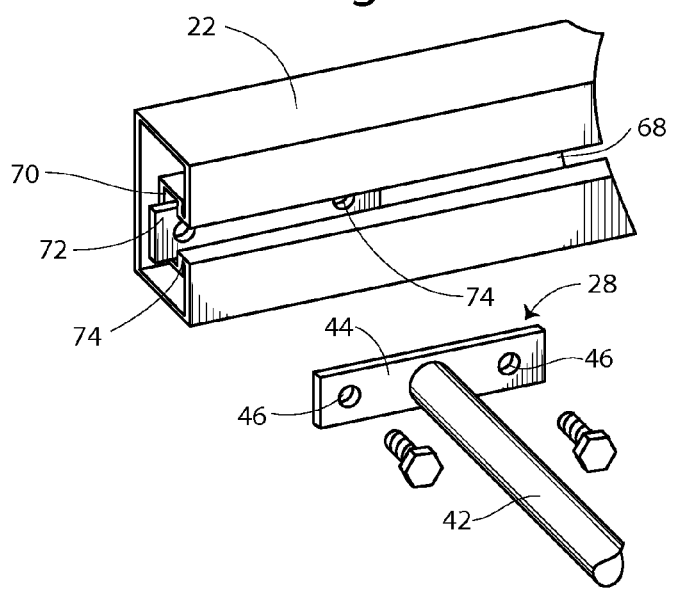
FIG. 4 is a perspective view of a portion of the side rail in an alternate embodiment of the truck rack.

FIG. 4 illustrates in perspective view in an alternate embodiment of the side rail 22. In this embodiment, the side rail 22 defines a longitudinal slot 68 which opens to a cavity 70 within the side rail 22. The cavity 70 receives a moveable plate 72 that defines openings 74. Fasteners such as threaded bolts extend through the openings 46 in the plate 44 and engage the opening 74 in the plate 68 for rigidly securing the transverse member 28 to the side rail 22. In this manner, the side rail 28 may be selectively positioned relative to the truck bed for accommodating as necessary faller items in the bed of the truck. It is to be appreciated that this alternate embodiment may be used for attaching the forward, intermediate, or rear transverse member 28 as desired. Further, the use of the elongate slot 68 and moveable plate 70 may be readily incorporated within a lower side of the side rail 22 for selectively positioning the forward support 18, the rear support 20, and the intermediate members 28, to further accommodate differences in the dimensions of the truck bed to which the truck rack 10 is installed.

Figure 5:
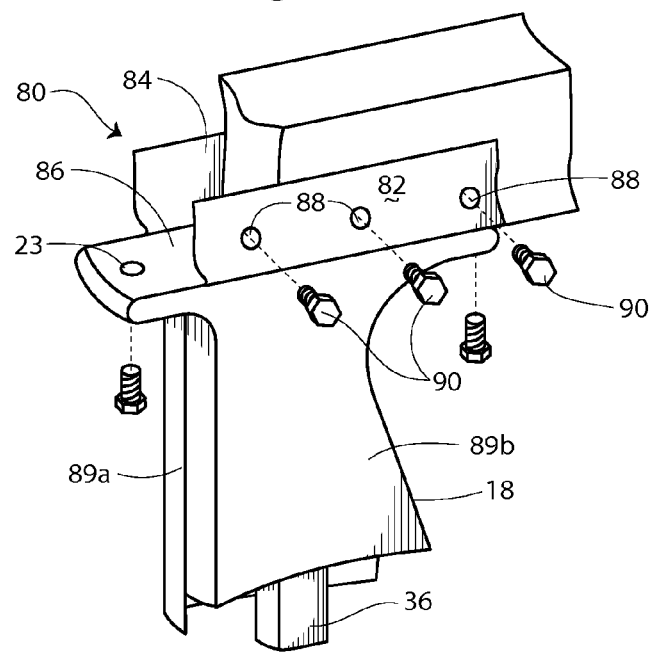
FIG. 5 is a perspective view of a portion of a side rail and front support in an alternate embodiment of the truck rack.

FIG. 5 illustrates in perspective view a portion of the side rail 22 and the front support 18 in an alternate embodiment of the truck rack 10 in which a support member 80 interconnects between the side rail and the front support. The support member 80 includes opposing walls 82, 84 interconnected by a floor 86 that includes openings that align with the openings 23 in the header of the front support 18. The walls define openings 88. The support member 80 seats between the connection header of the front support and the side rail 22 that is received between the walls 82, 84. Fasteners 90 extend through openings 88 and into aligned openings in the side rail 22 to connect the front support 18 to the side rail 22. In an alternate embodiment, the support member 80 includes only one wall 82 to define an L-shape in cross-sectional view. The support member 80 conforms in cross-section to the shape of the side rail that seats within the support member, so in an alternate embodiment, the support member is curved conformingly to an arcuate surface of a side rail in that embodiment.

FIG. 5 further illustrates an alternate embodiment of the front support 18, in which the shell 32 assembles from opposing panels 89a and 89b about the frame member 36. The panels 89a and 89b are readily molded and joined with fasteners or fastening material along mating edges such as with adhesive, bonding material, clips, screws, or other fasteners.

Figure 6:
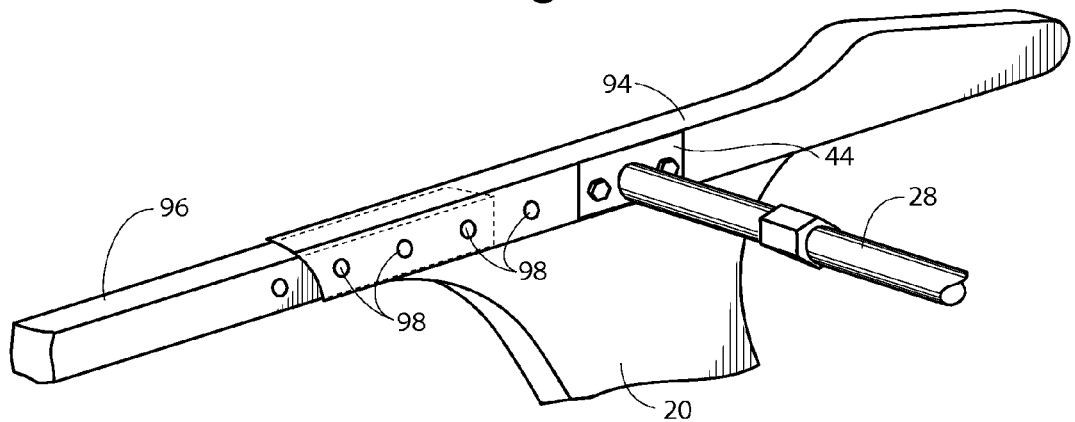
FIG. 6 is a perspective detailed view of an alternate embodiment of the side rail for the truck rack illustrated in FIG. 1.

FIG. 6 illustrated in perspective detailed view an alternate embodiment of the side rail 90, in which a bed portion 92 includes a member 94 that telescopingly receives a member 96, in order to slidably position to a selected length for adjusting the length of the track rack to accommodate different length truck beds 14. The side walls of the members 94, 96 define a plurality of spaced-apart holes 98 that align and receive fasteners to rigidly connect the members 94, 96. A forward end portion of the member 96 connects to the front support 18 and the traverse member 28 as discussed above with respect to the side rail 22.

In an alternate embodiment, the front support 18, the rear support 20, and the side rails 22 are made of metal or other rigid material, and do not include the interior frame members 36.

With reference to FIG. 1, the truck rack 10 assembles by attaching the front and rear supports 18, 20 to the side walls 16 of the bed 14 with fasteners through the openings 23 in the footer. Openings may need to be made in the side walls 16 but that is within the skill of a typical installer. In some installations, stakes received in stake pockets are used for supporting the truck rack 10. The side rails 22 attach to respective aligned front and rear supports 18, 20 with fasteners. With reference to FIG. 3A, the front support 18 attaches selectively positioned along the longitudinal length of the side rail using selected ones of the openings 64. With reference to FIG. 2, the transverse members 28 attach with fasteners through the plates 44. The primary member 40 attaches while the distal end with the secondary member 42 is held level relative to the side rail 22. The secondary member 40 moves longitudinally relative to the primary member 40 to abut the plate 44 against the side rail 22. The secondary member 42 attaches with fasteners through the plate 44. The coupler 54 tightened by rotation on the threaded portion 52 secures the primary member 40 and the secondary member 42 together. While three transverse members 28 are illustrated, additional members may be used selectively for supporting articles on the truck rack. Tie-down straps connect to the loops 45 or to the transverse members 28 for securing articles. With reference to FIG. 4, an embodiment having the slot 68 in the side rails 22 permits loosening of the attachment plate 44 and sliding the transverse member 28 longitudinally relative to the side rails 22 for accommodating particular load requirements. For example, a large package or article may require extending to or above the transverse members of the truck rack. The transverse member is removed or moved to a selected position towards the middle or the back of the rack as necessary.

While the present invention has been described in detail with particular references to the preferred embodiments thereof, it should be understood that many modifications, additions, and deletions, in addition to those expressly recited, may be made thereto without departure from the spirit and scope of the invention as defined by the appended claims.

What is claimed is:

1. A truck rack for mounting to the sidewalls of a cargo box of a pickup truck, comprising:
   a pair of upright front supports of a thickness approximately matched to the thickness of said sidewalls and spaced apart so as to be positioned to be mounted upon a respective cargo box sidewall at a forward end of the cargo box;
   a pair of upright rear supports of a thickness approximately matched to the thickness of said sidewalls spaced apart so as to be mounted upon respective sidewalls;
   a pair of elongated top side rails each connected atop said rear and forward supports to be mounted on a respective side of said cargo box;
   a plurality of cross members extending transversely between said side rails, each cross member having opposite ends connected to a respective top side rail to form a unitary rack structure;
   each of said front and rear supports and said top side rails including an interior rigid metal tube extending within and completely enclosed by a hollow respective outer shell, said interior tube in said front and rear supports each attached at a bottom end to a mounting piece adapted to be attached to said one of said cargo box sidewalls and affixed at a top end to a top mounting piece;
   said side rails interior tubes each connected to said top mounting piece affixed to said top end of said interior tube of each of said front and rear supports;
   said connected interior tubes of said upright supports and said top side rails together forming a metal framework supporting said plurality of cross members attached at either end to said interior tube of each of said top side rails;
   said outer shells enclosing a respective front and rear support substantially elongated in a lengthwise direction along said cargo box sidewalls to be substantially longer than said interior tubes in said lengthwise direction, and having a streamlined tapered shape comprised of opposite sides of each of said outer shells enclosing a respective front and rear support converging at a rear end portion of said shells; and
   said top side rails outer shells each having at least portions thereof enlarged to be of a greater height than said interior tubes of said top side rails.

2. The truck rack according to claim 1 wherein said rear support outer shells opposite sides are also tapered towards a front end thereof.

3. The truck rack according to claim 1 wherein said outer shells are formed of molded fiberglass and said enclosed interior tubes and cross members are made of metal.

4. The truck rack according to claim 1 wherein said front and rear support outer shells are substantially longer at the top and bottom than at the middle in a lengthwise direction of the rack and have at least one curved side extending in from said longer bottom portion of said outer shell to a shorter middle portion of said outer shell and curving back out to longer top of said outer shell.

5. The truck rack according to claim 4 wherein both sides of said rear support outer shells are each curved in from a wider bottom portion in a lengthwise direction to a shorter middle and curving out to a wider top.

6. A truck rack for mounting to the sidewalls of a pickup truck cargo box, comprising:
   front and rear pairs of spaced apart upright substantially vertical supports spaced apart a distance so as to be adapted to be mounted to the front and rear ends of a respective cargo box sidewall, each of said supports including a narrow elongated support member having a bottom piece fixed to a lower end for mounting the supports to the sidewalls; wherein each narrow elongated support member is disposed within a respective hollow outer shell which is substantially longer in a lengthwise direction along said sidewall than a thickness thereof, said thickness of said hollow outer shells substantially matched to a thickness of said sidewalls, the entire height of each elongated support member extending up within a respective hollow outer shell;
   said hollow outer shells each having a streamlined shape defined by tapering down of opposite sides of said hollow outer shell and completely enclosing all sides of a respective elongated support member, with said shell opposite sides spaced apart a distance defining said thickness of each support; said sides of said outer shells converging towards a rounded rear end thereof;
   a pair of elongated top side rails each extending across tops of a respective aligned pair of front and rear vertical supports; each top side rail having an inner frame member attached at both ends to an upper end of one of said elongated support members in a respective vertical support, said side rails each having an outer hollow shell completely enclosing said inner frame member, the outer shell having a substantially greater height than width with a contoured shape;
   and a plurality of elongated cross members connected at opposite ends to a respective top side rail.

7. A truck rack according to claim 6 wherein said hollow shells enclosing said tubular members each have a rear end shape curving upwardly from a longer bottom end curving forwardly in a lengthwise direction to a shorter middle point and curving back rearwardly from said middle point out to a longer top end.

8. A truck rack according to claim 7 wherein said hollow shells enclosing said tubular members of said rear upright supports are curved upwardly along both front and rear ends curving rearwardly from a longer bottom end to a narrower middle point and curving forwardly from said middle point to a longer top end thereof.

9. A truck rack according to claim 6 wherein said side rails outer shells each have a contoured shape varying along the length thereof to a rounded leading end.

10. A truck rack adapted to be mounted to the side walls of a pickup truck cargo box comprising:
   an internal framework constructed of respective pairs of upright substantially vertical front and rear support tubes spaced apart so as to be mountable at the front and rear ends of said cargo box side walls, said support tubes connected at upper ends thereof to a respective one of a pair of spaced apart parallel top side rails, said side rails connected together with a plurality of elongated cross members extending between said top side rails, with spaced apart bottom ends of the front and rear support tubes adapted to be connected to said cargo box side walls by mounting pieces fixed to the bottom ends of said front and rear support tubes;
   each front and rear support tube of said upright supports having a shaped hollow shell completely enclosing and surrounding all sides of a respective support tube, the entire height of said front and rear support tubes extending up within a respective hollow shell, said shaped hollow shells tapering down in thickness to a rounded rear end thereof;

and each of said top side rails including an inner frame member and a hollow outer shell completely enclosing said inner frame member, both ends of each inner frame member being mounted to an upper end of a respective vertical support tube by a top mounting piece.

* * * * *